United States Patent
Kao et al.

(10) Patent No.: US 7,198,413 B2
(45) Date of Patent: Apr. 3, 2007

(54) PARALLEL OPTICAL SUBASSEMBLY MODULE STRUCTURE

(75) Inventors: Chih-Ting Kao, Hsinchu (TW); Chih-Hsiang Ko, Hsinchu (TW); Bor-Chen Tsai, Hsinchu (TW); Chun-Hsun Chu, Hsinchu (TW); Yii-Tay Chiou, Hsinchu (TW); Jung-Tai Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/915,369

(22) Filed: Aug. 11, 2004

(65) Prior Publication Data

US 2005/0185896 A1 Aug. 25, 2005

(30) Foreign Application Priority Data

Feb. 20, 2004 (TW) ............................... 93104353 A

(51) Int. Cl.
G02B 6/36 (2006.01)

(52) U.S. Cl. .......................................... 385/89; 385/93
(58) Field of Classification Search ............. 385/88–94
See application file for complete search history.

(56) References Cited

U.S. PATENT DOCUMENTS

| | | | |
|---|---|---|---|
| 5,574,814 A | 11/1996 | Noddings et al. | |
| 6,203,212 B1 | 3/2001 | Rosenberg et al. | |
| 6,488,417 B2 | 12/2002 | Kropp | |
| 6,637,947 B2 | 10/2003 | Melchior et al. | |
| 6,736,553 B1* | 5/2004 | Stiehl et al. | 385/89 |
| 6,921,214 B2* | 7/2005 | Wilson | 385/89 |
| 2002/0034363 A1* | 3/2002 | Wickman et al. | 385/88 |
| 2003/0113071 A1 | 6/2003 | Kim et al. | |
| 2003/0113077 A1 | 6/2003 | Xu et al. | |
| 2003/0138223 A1* | 7/2003 | Sasaki et al. | 385/93 |
| 2004/0033016 A1* | 2/2004 | Kropp | 385/31 |
| 2004/0264884 A1* | 12/2004 | Liu | 385/89 |
| 2005/0084216 A1* | 4/2005 | Yang et al. | 385/71 |

* cited by examiner

*Primary Examiner*—Sung Pak
*Assistant Examiner*—Tina M. Wong
(74) *Attorney, Agent, or Firm*—Harness, Dickey & Pierce, P.L.C.

(57) ABSTRACT

A parallel optical subassembly module structure comprises an opto-electronic device array, a base with a reflecting slope, and a micro-lens array plate with an inclined plane provided with a specific angle. The optical signal emitted from the opto-electronic device array reflects by the reflecting slope and is incident into the inclined plane of the micro-lens array plate with the specific angle. The inclined plane rectifies the optical signal to output in horizontal direction. Then the optical signal couples with the external fibers through each micro lens of the micro-lens array. The pathway of receiving the optical signal is the same as described above, but in reverse direction.

16 Claims, 10 Drawing Sheets

PARALLEL OPTICAL SUBASSEMBLY MODULE STRUCTURE

BACKGROUND OF THE INVENTION

1. Field of Invention

The present invention relates to an optical module structure, and more particularly, to a parallel optical subassembly module structure for a parallel optical data link.

2. Related Art

The parallel optical data link as one of the new methods of transmission has been developed to respond to the shift of fiber communication from a long-distance backbone network to clients.

The so-called parallel optical data link is to transmit parallel optical signals Point-to-Point without doing any parallel/serial switch so as to transmit optical signals in parallel through different fibers at high speed to achieve high bandwidth required by multi-clients in access network.

The parallel optical data link can be practically applied to the board-to-board data link in the back plane of communication apparatus, as well as to the data link between multi-processors and peripheral of high-level servers in LAN (For example: data transmission in the memory from one chip to another) to break the bottleneck of data transmission.

The key devices of parallel optical subassembly module applying to parallel optical data link are the VCSEL array in the optical signals emitting part and the PD array in the optical signals receiving part. The structure of the module depends on either optical turn or electrical turn in operation.

FIG. 1A illustrates a structure of the optical turn in optical signals emitting part, and FIG. 1B illustrates a structure of the electrical turn in optical signals emitting part. Referring to FIG. 1A, An optical signal emitted from a VCSEL array 10 couples with a fiber array 30 after reflecting 90° by a reflecting mirror 20. The reflecting mirror 20 is used to perform the optical turn.

Referring to FIG. 1B, for the characteristics of vertical light-emitting of VCSEL array 10, most of the parallel optical subassembly modules using VCSEL array 10 as a light source take the structure of electrical turn to make the lighting area of the VCSEL array 10 face the fiber array 30 directly to couple light.

In the structure of an optical turn, many devices are required to achieve an optical turn, and thereby the tolerance of fabricating devices and the reliability of production is reduced. Besides, the structure of an optical turn is quite unfeasible and has difficulties in mass production.

Furthermore, since some optical devices are made from optical plastic materials with a relatively high coefficient of thermal expansion (CTE) to undergo processes of injection molding, the devices dilate and deform under thermal loading, and the coupling efficiency of devices deteriorate as a result.

As for the electrical turn, it is preferable to accomplish the electrical turn by flexible printed circuit board (FPC) as disclosed in the U.S. Pat. No. 6,203,212, instead of a lead frame or electroplating trace pattern with 90° turn, since FPC with better flexibility of fabrication matches the impedance.

In the U.S. Pat. Application Publication No. 2003/0113071 A1 disclosed a subassembly for use in fiber optic communications. The subassembly also uses a flexible circuit to connect a carrier assembly and a circuit board in order to accomplish the electrical turn. Because the signal quality at high frequency transmission of the ceramic substrate is better than that of the FPC, efficiency of the assembly is better than that with all FPC. Some optical devices and the driver IC are all set on the carrier assembly. This design will increase the height and the volume of the transceiver module. Besides, the heat generation power of the driver IC is extremely high. This will increase the temperature of some area. The optical devices made of high CTE material and the carrier assembly will deform because of the CTE mismatch between the optical devices and the carrier assembly as mentioned before. This will affect the coupling efficiency.

As for the electrical turn, when the FPC is bended with a large angle (90°), it is hard to evade the impedance discontinuity. Especially in the case of high frequency transmission, there is reflection noise at the bending part of the FPC. The method of increasing the curvature radius of the bending part of the FPC to diminish negative effects caused by the bending would lengthen the trace of the circuit, and thereby worsen the transmission of high frequency signals. So a transmission structure of the optical turn is necessary.

SUMMARY OF THE INVENTION

Accordingly, the object of the present invention is to provide a parallel optical subassembly module structure for transmitting signals in the parallel optical data link system. The parallel optical subassembly module structure of the present invention adopts the structure of the optical turn, and transmits electric signals at high frequency by connecting a flexible printed circuit board (hereafter called as "FPC") with other PCBs.

The parallel optical subassembly module structure includes a base, an opto-electronic device array, a top cover, a FPC, a micro-lens array plate, and a pair of guide pin.

The base includes a reflecting slope for reflecting optical signals, a first U-groove pair, and a trace pattern provided thereon for driving the opto-electronic device array to transmit optical signals.

The opto-electronic device array corresponding to the trace pattern of the base includes a plurality of opto-electronic devices arranged in an array form for transmitting optical signals.

The top cover provided on the base includes a space for containing the opto-electronic device array and protecting the trace pattern on the base, the second U-groove pair corresponding to the first U-groove pair, and a metal ground layer arranged on the surface of the top cover corresponding to the base for restraining the cross talk of the base while in operation at high frequency and achieving impedance matching.

The FPC is arranged on the base for transmitting electric signals between the base and external circuits.

The micro-lens array plate is arranged at a side in the proximity of the reflecting slope after combination of the base and the top cover, having a plurality of micro lenses and a pair of pin holes, and more particularly having an inclined plane with a specific angle.

The guide pin are received by the pin holes in the space formed by the first U-groove pair and the second U-groove pair, so as to assemble and position the parallel optical subassembly module structure and the optical connector.

The optical signals emitted from each opto-electronic device reflect at the reflecting slope, and are on the inclined plane with a specific angle, so that the inclined plane rectifies the optical signals to output in horizontal direction, and then the optical signals couple with the fibers of optical connector through each micro lens. The pathway when receiving the optical signal is the same as described above, but in reverse direction.

The whole structure of the present invention is more concise and stable than the prior art, and overcomes the reflection noise at the bending part of the FPC in electrical turn. Furthermore, the present invention effectively diminishes the cross talk at high frequency to ensure the completeness of the high-frequency electric signals, so that wider bandwidth is created.

Furthermore, the present invention can be easily and mass fabricated by applying fully developed MEMS fabrication processes to fabricate the base and the top cover, and the interface of the module design fit the commercial parallel optical connector standard.

The parallel optical subassembly module structure of the present invention has a smaller volume and a more stable structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only and thus doesn't limit the present invention, wherein.

DETAILED DESCRIPTION OF THE INVENTION

Figure 1A:
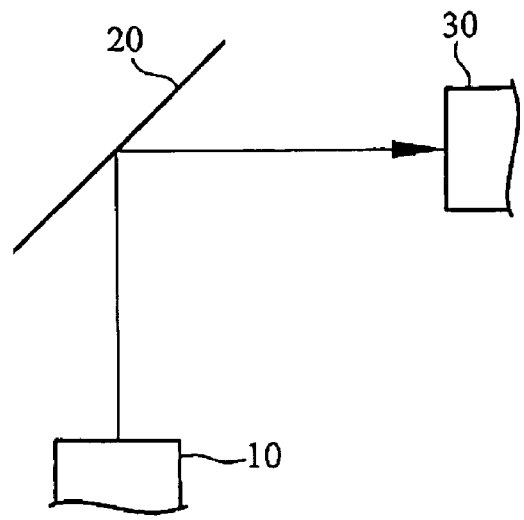
FIG. 1A illustrates a structure of the optical turn in optical signals emitting part.
Figure 1B:
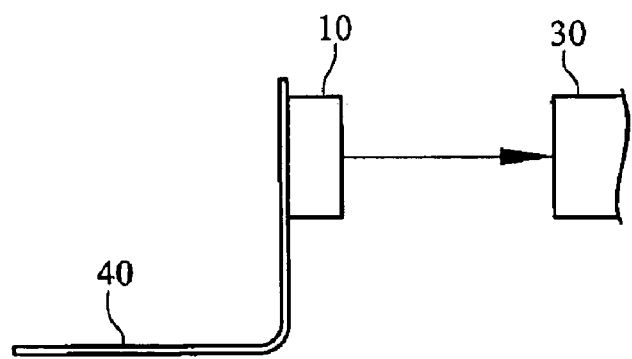
FIG. 1B illustrates a structure of the electrical turn in optical signals emitting part.
Figures 2A, 2B:
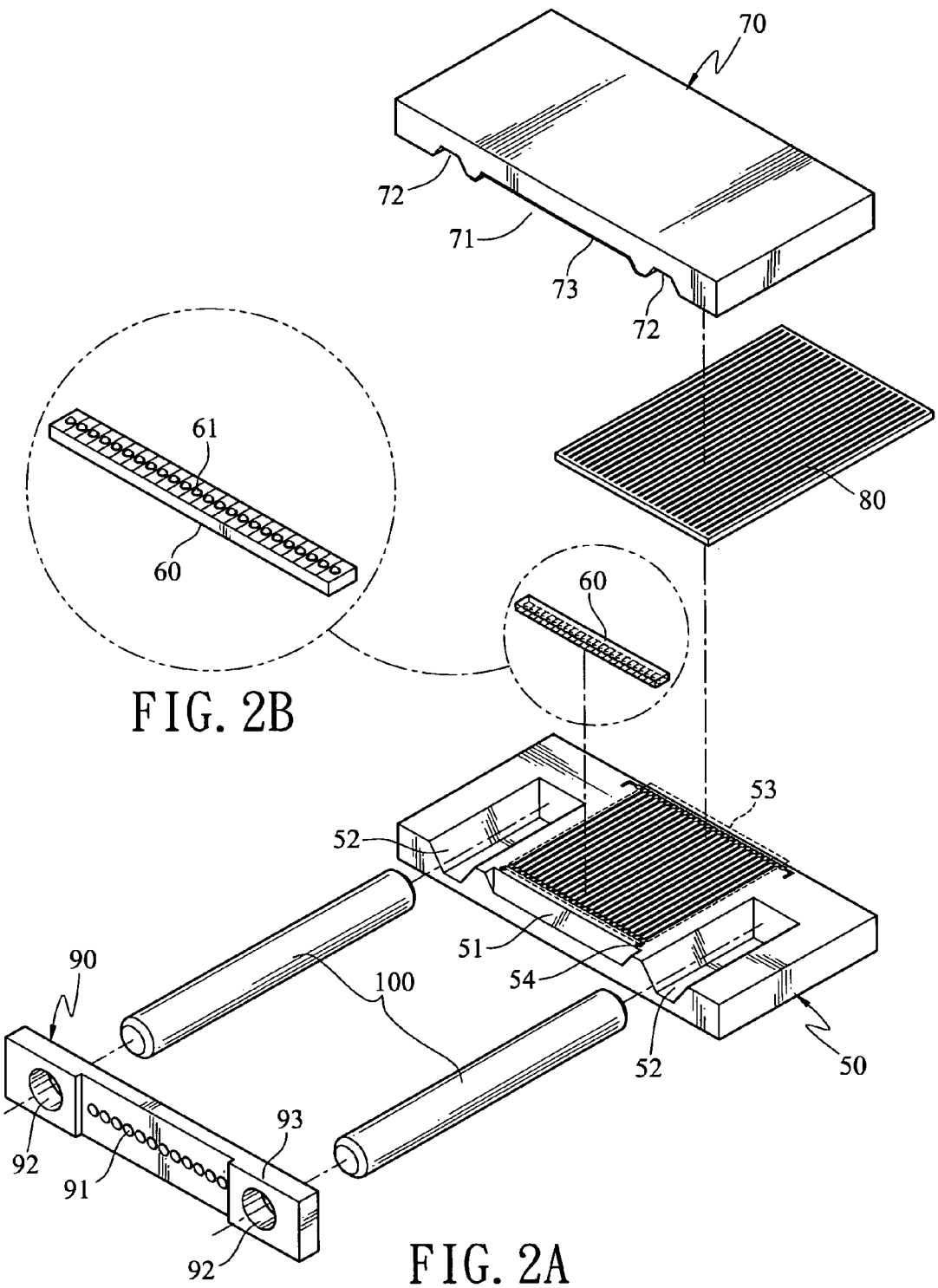
FIG. 2A illustrates an exploded view of a parallel optical subassembly module structure with a preferred embodiment of the present invention.
FIG. 2B illustrates a bottom view of a opto-electronic device array shown in FIG. 2A.
Figure 2C:
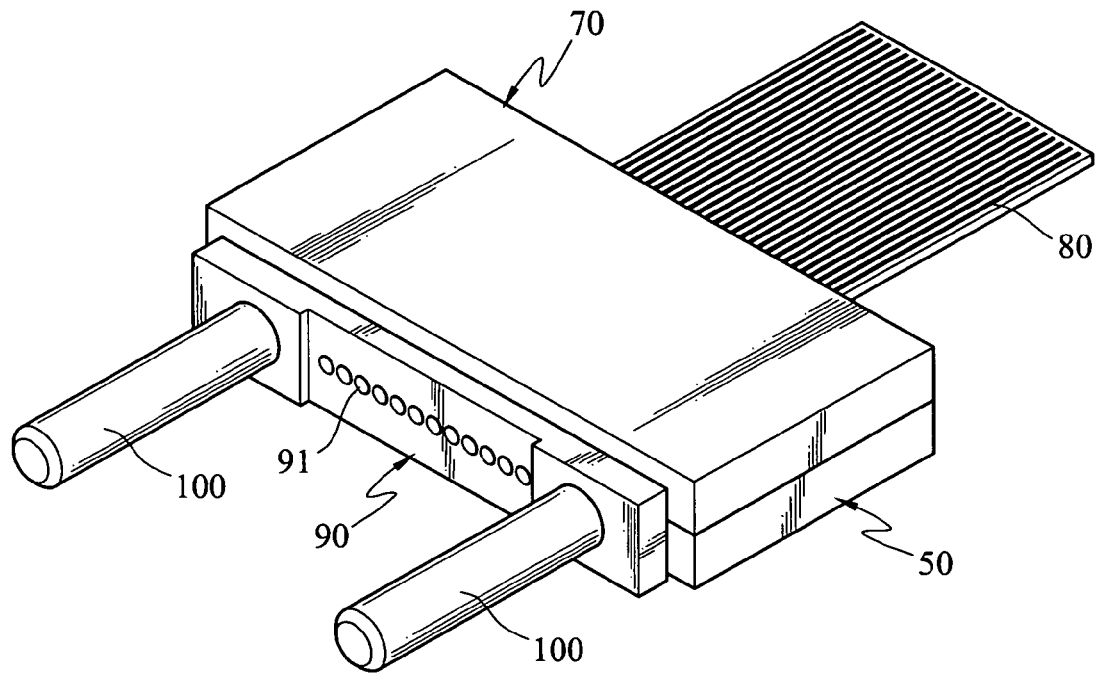
FIG. 2C illustrates a perspective view of a parallel optical subassembly module structure with a preferred embodiment of the present invention.

FIG. 2A and FIG. 2C illustrate an exploded view and a perspective view of a parallel optical subassembly module structure with a preferred embodiment of the present invention respectively, referring to FIG. 2A and FIG. 2C, the module structure, having a base 50, a opto-electronic device array 60, a top cover 70, a flexible printed circuit board (hereafter called as "FPC") 80, a micro-lens array plate 90, and a guide pin 100, applies to signal transmission of parallel optical data link. FIG. 2B illustrates a bottom view of a opto-electronic device array shown in FIG. 2A The module structure can be applied in a optical signal-transmitting part with the opto-electronic device array 60 being a vertical cavity surface emitting laser array (hereafter called as 'VCSEL array'), or in a optical signal-receiving part with the opto-electronic device array 60 being a PD array. The direction of the optical signal transmission in the module of optical signal-transmitting part is reverse to one in the module of optical signal-receiving part, and a trace pattern 53 should be amended to suit a different opto-electronic device. The light-emitting part is taken as a preferred embodiment.

The base 50 is a silicon base, having a reflecting slope 51 for reflecting optical signals to achieve the optical turn and the first U-groove pair 52 parallel to each other. TR coating is on the reflecting slope 51.

The first U-groove pair 52 for loading the guide pin 100 is made by the etching fabrication process of MEMS technology to etch U-shape or V-shape (cross-section view) troughs on the silicon base.

There are trace pattern 53 and alignment marks 54 on the surface of the base 50. The trace pattern 53 is connected to the circuit pattern of the FPC 80 to accomplish signal transmissions in the whole circuit and to drive the opto-electronic device array 60. The trace pattern 53 shown in the figure is simply an embodiment, and can be amended according to requirements. The alignment marks 54 help for alignment when positioning opto-electronic device array 60.

The opto-electronic device array 60 is set on the base 50 relative to the trace pattern 53, having a plurality of opto-electronic devices parallel to each other in an array form for emitting parallel optical signals driven by the trace pattern 53. Generally, in a light-emitting part, the opto-electronic device array 60 is a VCSEL, and, in a lighting-receiving part, the opto-electronic device array 60 is a PD array.

Figure 3:
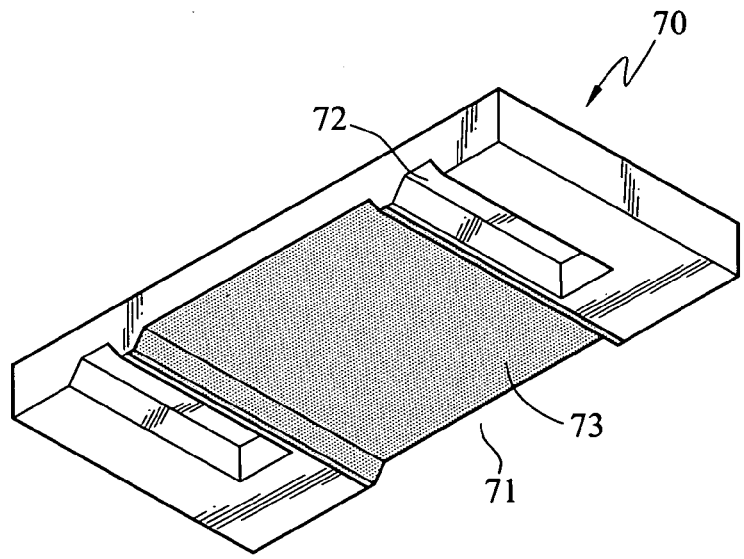
FIG. 3 illustrates a perspective view of the top cover.

FIG. 3 is a perspective view of the top cover 70. Referring to FIG. 3, the top cover 70 arranged on the base 50 has a space 71 for containing the opto-electronic device array 60 and protecting the trace pattern 53 and other devices on the base 50, a pair of second troughs 72, and a metal ground layer 73.

The second U-groove pair 72 are respectively corresponding to the first U-groove pair 52, and a space formed by the second U-groove pair 72 and the first U-groove pair 52 is to contain the guide pin 100. The second U-groove pair 72 are also made by the etching fabrication process to form U-shape or V-shape grooves on the silicon base.

When the VCSEL array is used to engage high frequency transmission, there is cross talk between signals to effect accuracy of signals, since the interval between adjacent laser active area is 250 µm as a standard. In order to solve the problem described above, the present invention arranges the metal ground layer 73 on the surface of the top cover 70 for restraining the cross talk of the base 50 while in operation at high frequency and achieving impedance matching. Therefore, the parallel optical subassembly module structure of the present invention can develop towards the operation at high frequency and resist external EMI. Furthermore, the heat dissipation of the module structure can be improved, due to the better heat conductivity of the metal ground layer 73.

The FPC 80 is arranged at the back side of the base 50, and electrically connected to the trace pattern 53 to make the base 50 transmit electric signals to external circuits through the FPC 80.

In order to improve the signal quality at high frequency transmission, the top surface is taken as a ground layer with designing the characteristic impedance of transmission lines to match impedance of the module, and the pads are patterned on the bottom surface to electrically connect to the trace pattern 53 of the base 50.

Since the present invention adopts the structure of optical turn, the FPC 80 connects to other PCBs without bending, thereby avoiding negative effects at high frequency in the structure of electrical turn.

Figure 4A:
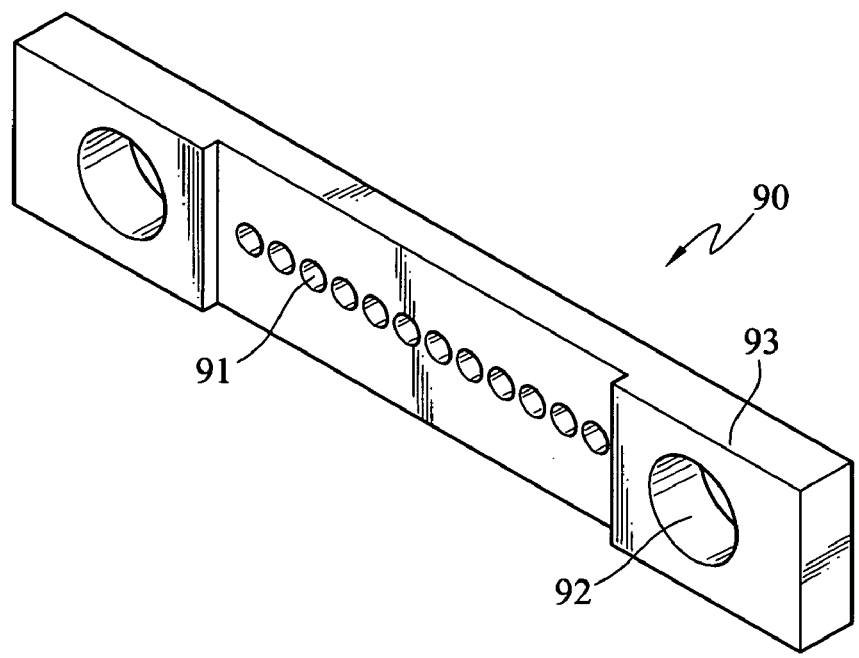
FIG. 4A shows a front view of the micro-lens array plate.

The micro-lens array plate 90 is arranged at a side in the proximity of the reflecting slope 51 after combination of the base 50 and the top cover 70. FIG. 4A shows a front view of the micro-lens array plate 90, and FIG. 4B shows a back view of the micro-lens array plate 90.

Referring to FIG. 4A, the micro-lens array plate 90 has a plurality of parallel micro lenses 91 arranged in the array form for focusing optical signals, a pair of pin holes 92 arranged on both sides of the micro lenses 91 for receiving the guide pin 100 as a function of positioning, and a pair of spacers 93 arranged respectively on the pin holes 92 for controlling the distance between the micro lenses 91 and the external fibers (not shown) so as to accomplish better light coupling by maintaining an ideal distance between them.

Figure 4B:
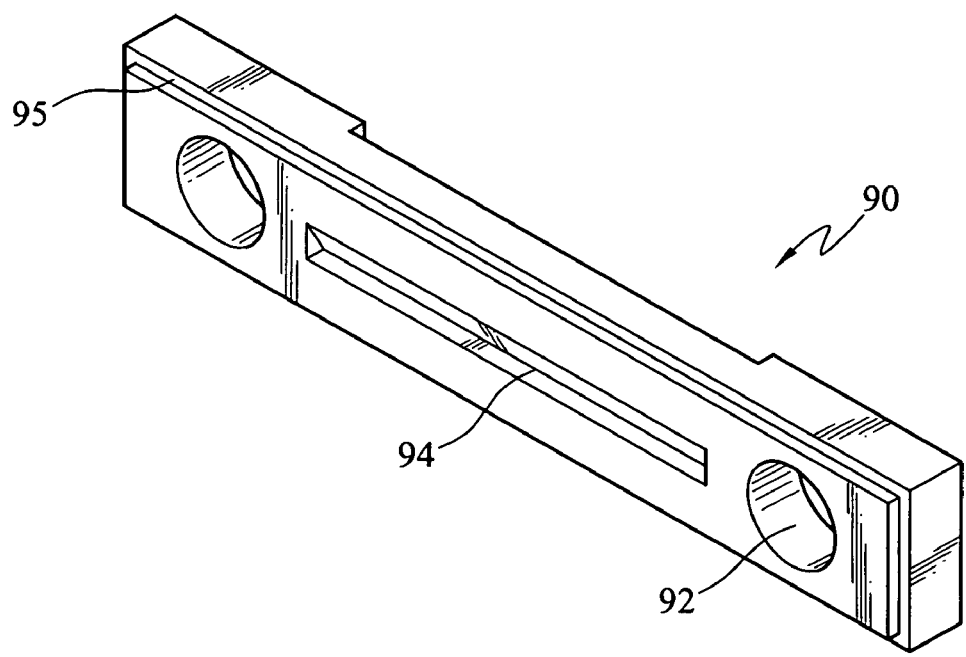
FIG. 4B shows a back view of the micro-lens array plate.

Referring to FIG. 4B, an inclined plane 94 with a specific angle and an adhesive plane 95 are arranged on the back surface of the micro-lens array plate 90. The inclined plane 94 is used to rectifying the light direction.

The adhesive plane 95 differs from the surface of the micro-lens array plate 90 in height so as to restrain adhesive glue applied uniformly to the adhesive plane 95 from leakage while the micro-lens array plate 90, the base 50, and the top cover 70 are bonding.

Figure 5:
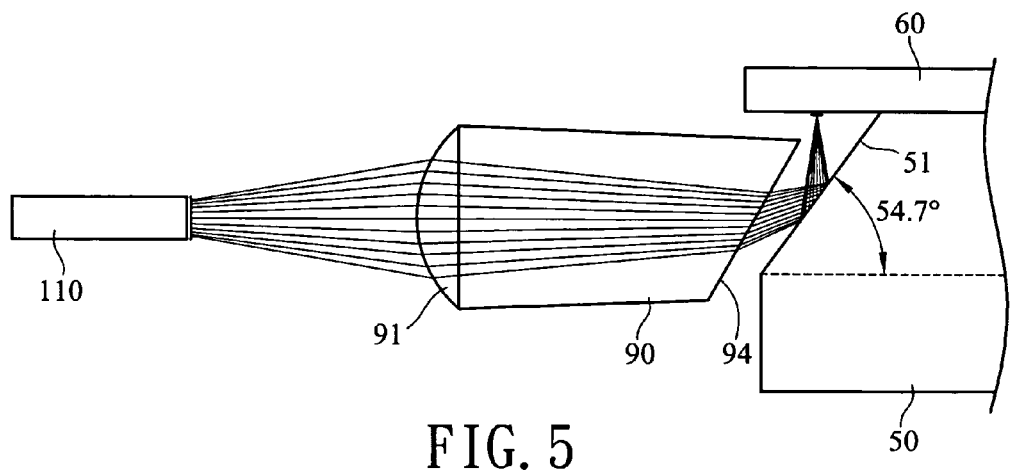
FIG. 5 shows a pathway of the optical signal.

Therefore, the inclined plane 94 with the calculated angle is arranged on the back surface of the micro-lens array plate 90. Referring to FIG. 5 showing a pathway of the optical signal, the optical signal emitted from the opto-electronic device array 60 reflects at the reflecting slope 51 and is on the inclined plane 94 of the micro-lens array plate 90 with the specific angle. The inclined plane 94 rectifies the optical signal to output in horizontal direction. Then the optical signal couples with the external fibers through each micro lens 91.

As shown in FIG. 2A and FIG. 2B, the pair of guide pin 100 is received by the pin holes 92 to contain in the space formed by the first U-groove pair 52 and the second U-groove pair 72, so as to assemble and position the parallel optical subassembly module structure and the external fibers. Since the guide pin 100 adapt to the present commercial standard interface, the module structure of the present invention directly and conveniently connects to parallel optical fiber connector.

Figure 6A:
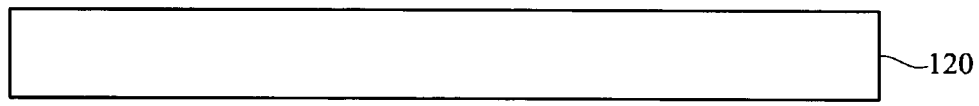
FIGS. 6A to 6L illustrate a fabrication process of a base according to an embodiment of the present invention.
Figure 6B:
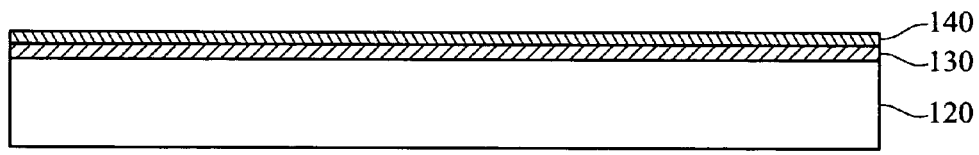

FIGS. 6A to 6L illustrate a fabrication process of a base according to an embodiment of the present invention. In FIG. 6A, a silicon base 120 is provided and cleaned to remove dust and organic impurities from the surface. Then, in FIG. 6B, a nitride layer 130 is deposited on the surface of the silicon base 120, and a photoresist layer 140 is coated on the nitride layer 130.

Figure 6C:
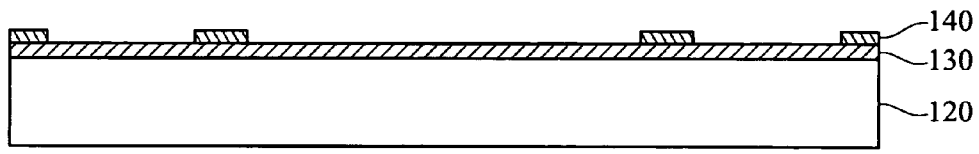
Figure 7:
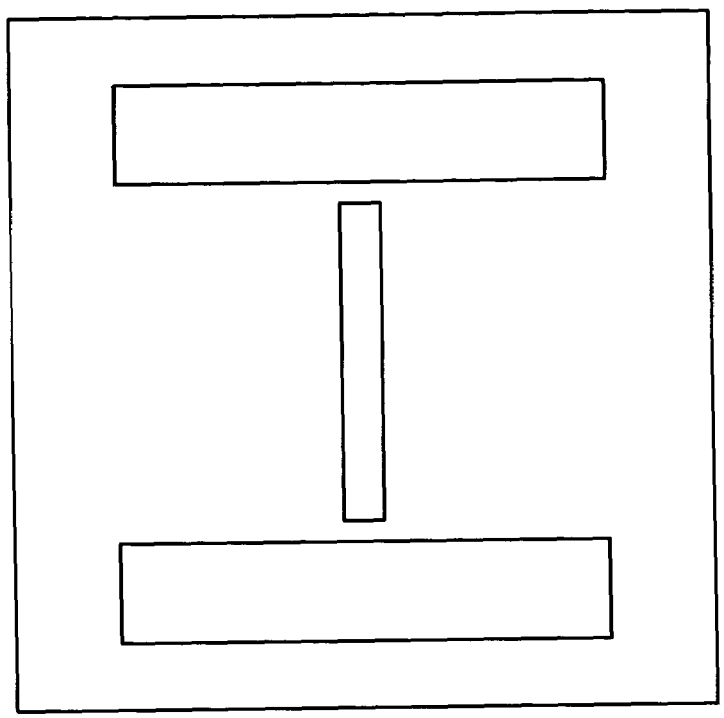
FIG. 7 shows a perspective view of a pattern in the mask.

Further, in FIG. 6C, the photoresist layer 140 undergoes a photolithography process by a pattern in the mask (shown in FIG. 7). The pattern in the mask makes the structure of the base 50 symmetrical with the pattern corresponding to the shape of the reflecting slope 51 and the first U-groove pair 52 of the base 50. The photoresist in the photoresist layer 140, corresponding to the reflecting slope 51 and the first U-groove pair 52, is removed after the photolithography process.

Figure 6D:
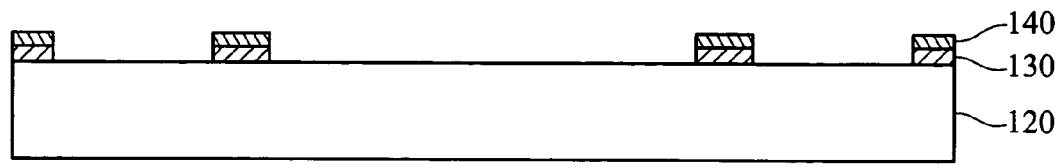
Figure 6E:

Then, in FIG. 6D, the nitride layer 130 is etched with the photoresist layer 140 as a mask to form a pattern corresponding to the reflecting slope 51 and the first U-groove pair 52, and then the photoresistance on the nitride layer 130 is removed as shown in FIG. 6E.

Figure 6F:
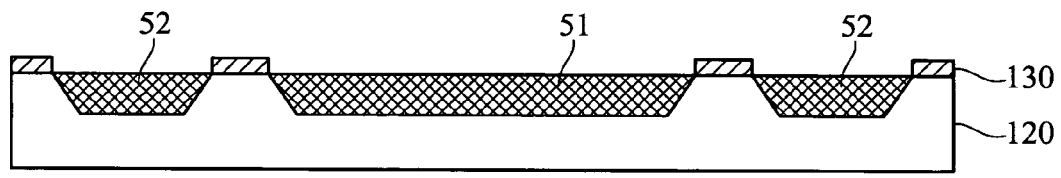

Further, in FIG. 6F, the silicon base 120 undergoes etching process (using potassium hydroxide to etch the silicon base 120 as an example) with the nitride layer 130 as a mask to form the reflecting slope 51 and the first U-groove pair 52 with the same depth.

Figure 6G:
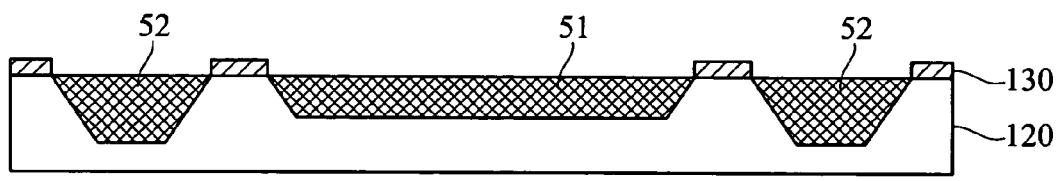

Then, in FIG. 6G, the silicon base 120 continues to be etched, and only the part of the first U-groove pair 52 is etched to form desired U-shape or V-shape grooves without the part of the reflecting slope 51 being etched due to different directions of the lattice of the silicon base 120.

Figure 6H:
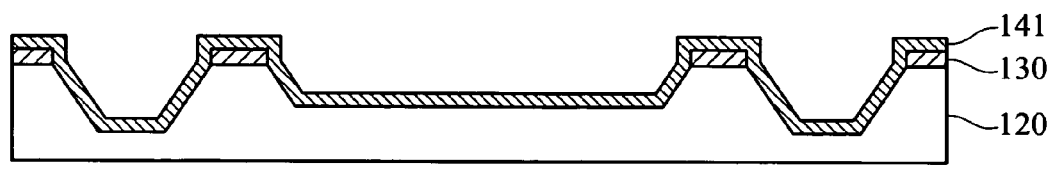
Figure 8:
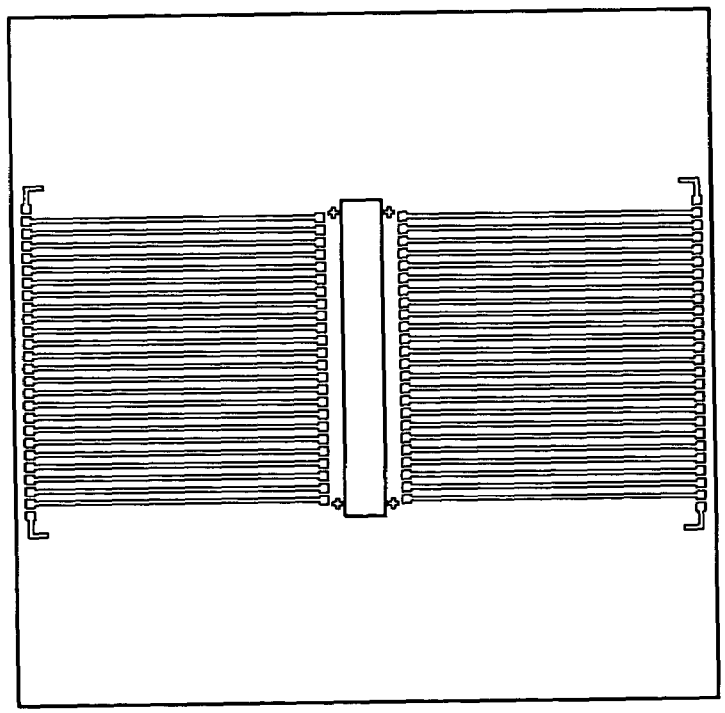
FIG. 8 shows a perspective view of another pattern in the mask.

Afterwards, we form the trace pattern, the alignment marks 54, and the TR coating on the reflecting slope 51 on preset areas of the base 50 by lift-off. Referring to FIG. 6H, another photoresist layer 141 is coated and undergoes the photolithography process by a pattern in the mask shown in FIG. 8. The pattern in the mask contains the photoresist exclusive of the trace pattern, the alignment marks 54, and the TR coating on the reflecting slope 51.

Figure 6I:
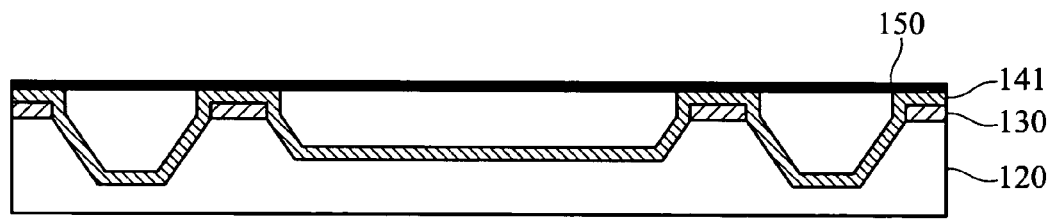
Figure 6J:
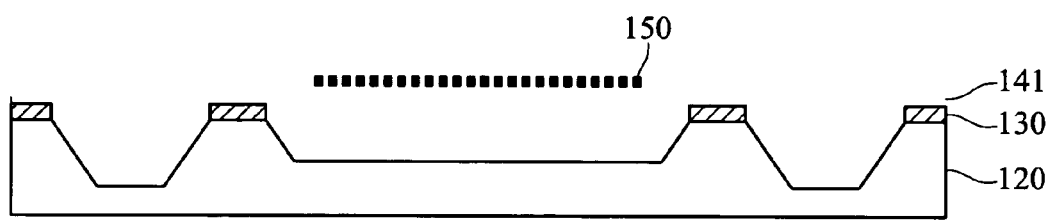

Then, in FIG. 6I, a metal film (such as gold) 150 is sputtered on the silicon base 120 to undergo the metal sputtering fabrication process. And in FIG. 6J, the remained photoresist layer 141 is removed from the silicon base 120 to form the trace pattern, alignment marks, and the TR coating on the reflecting slope 51 on the surface of the base, so that the reflecting slope 51, the first U-groove pair 52, the trace pattern 53, and the alignment marks 54 are fabricated on the base 50.

Figure 6K:
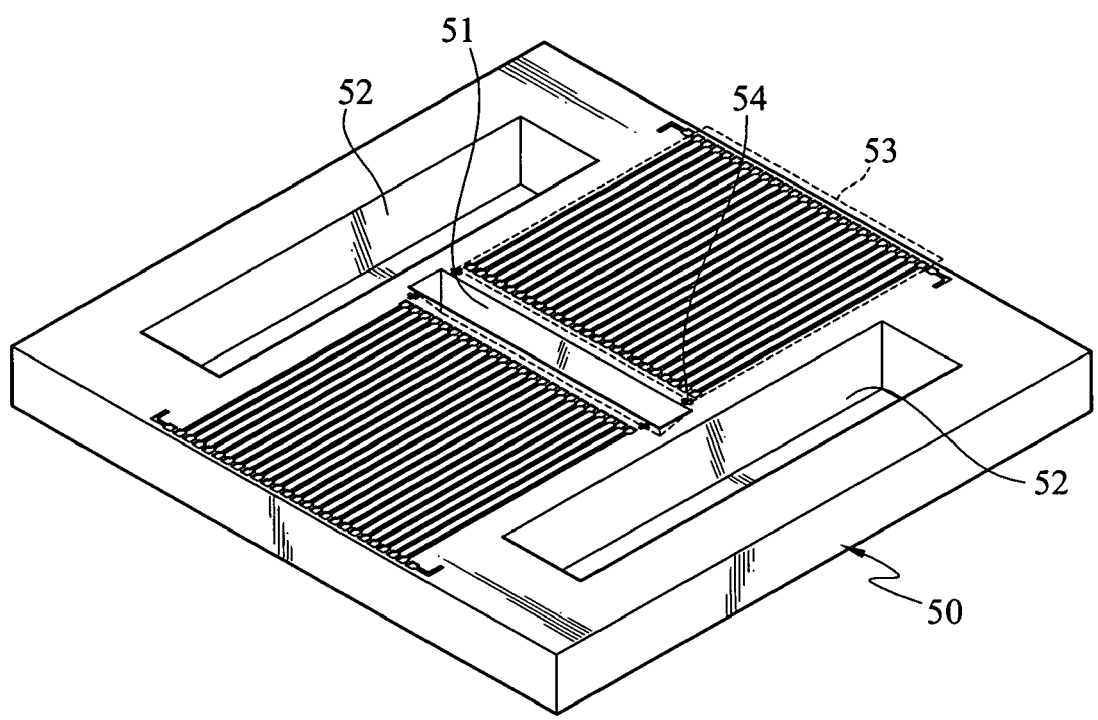
Figure 6L:
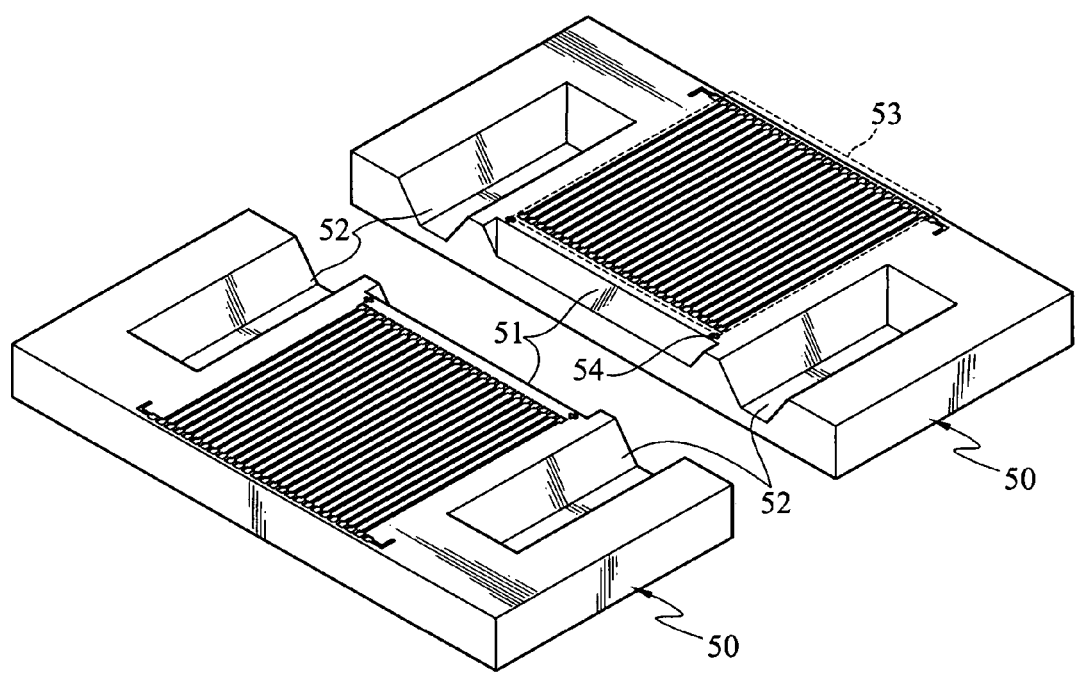

Then, in FIG. 6K, the silicon base 120 is diced to form a base 50 symmetrical in the structure. Finally, in FIG. 6L, the base 50 undergoes the step of crystal-orientation breaking to form two independent bases 50.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parallel optical subassembly module structure, comprising:
    an opto-electronic device array having a plurality of opto-electronic devices arranged in an array form for emitting/receiving optical signals;
    a silicon base for loading the opto-electronic device array, having a reflecting slope for reflecting optical signals to achieve optical turn, and driving the opto-electronic device array by a trace pattern provided on the silicon base;
    a top cover arranged on the base for containing the opto-electronic device array and protecting the trace pattern of the silicon base, wherein a metal ground layer is provided on one surface of the top cover; and
    a micro-lens array plate arranged at one side in the proximity of the reflecting slope of the silicon base, having a plurality of micro lenses and an inclined plane with a specific angle on the side in the proximity of the reflecting slope;
    wherein the optical signals emitted from each opto-electronic device reflect at the reflecting slope, and are incident into the inclined plane with the specific angle, so that the inclined plane rectifies the optical signals to output in horizontal direction, and then the optical signals couple with external fibers through each micro lens; the optical signals received from the external fibers by each micro lens are incident into the reflecting slope through the inclined plane, and then reflect at the reflecting slope to input to each opto-electronic device.

2. The structure according to claim 1, wherein the silicon base further includes a parallel first U-groove pair, the top cover further includes the second U-groove pair corresponding to the first U-groove pair, the micro-lens array plate further includes a pair of pin holes arranged on both sides of the micro lenses, and the structure further includes a pair of guide pin received by the pin holes to contain in the space formed by the first U-groove pair and the second U-groove pair to assemble the parallel optical subassembly module structure and the external fibers.

3. The structure according to claim 2, wherein the first groove pairs are transverse U-shape groove.

4. The structure according to claim 2, wherein the first groove pairs are transverse V-shape groove.

5. The structure according to claim 2, wherein the second groove pairs are transverse U-shape groove.

6. The structure according to claim 2, wherein the second groove pairs are transverse V-shape groove.

7. The structure according to claim 1, further comprising a PCB arranged on the base for transmitting electric signals between the base and the external circuits.

8. The structure according to claim 7, wherein the PCB is a FPC.

9. The structure according to claim 1, wherein the opto-electronic device array is a VCSEL array.

10. The structure according to claim 1, wherein the opto-electronic device array is a PD array.

11. The structure according to claim 1, wherein the silicon base further includes at least one alignment mark for positioning the opto-electronic devices.

12. The structure according to claim 1, wherein the reflecting slope is TR coating.

13. The structure according to claim 1, wherein the top cover further includes a metal ground layer corresponding to the surface of the silicon base.

14. The structure according to claim 1, wherein the micro-lens array plate further includes a plurality of spacers arranged on a side opposite to the side in the proximity of the reflecting slope for controlling the distance between the micro lenses and the external fibers.

15. The structure according to claim 14, wherein the spacers are arranged on both sides of the micro-lens array plate.

16. The structure according to claim 1, wherein the micro-lens array plate further includes an adhesive plane differing from the side in height so as to apply adhesive glue uniformly to the adhesive plane for binding the micro-lens array plate, the base, and the top cover.

* * * * *